3,095,421
BIS-AZOLYL-TETRAHYDROTHIOPHENE COMPOUNDS
Peter Liechti, Binningen, Adolf Emil Siegrist, Basel, Max Duennenberger, Birsfelden, and Erwin Maeder, Muenchenstein, Switzerland, assignors to Ciba Limited, Basel, Switzerland, a company of Switzerland
No Drawing. Filed July 31, 1961, Ser. No. 127,879
Claims priority, application Switzerland Aug. 11, 1960
9 Claims. (Cl. 260—304)

The present invention provides a process for the manufacture of bis-azolyl-thiophene compounds of the general formula (1)
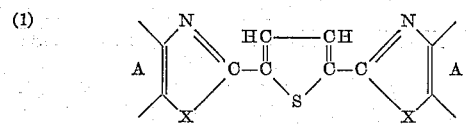

where A represents an unsubstituted or substituted phenylene radical and X an oxygen or sulfur atom or the group

in which R represents a hydrogen atom or an organic substituent, as well as of salts of the bis-imidazyl-thiophenes

wherein an amino aminobenzene of the general formula (2)

where A and X have the above meanings, or a salt thereof is reacted at an elevated temperature, and advantageously in the presence of a catalyst, with tetrahydrothiophene-2:5-dicarboxylic acid of the formula

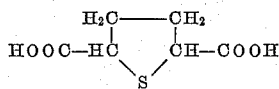

or with a functional derivative of this dicarboxylic acid, whereupon the resulting tetrahydrothiophene derivative of the general formula (3)
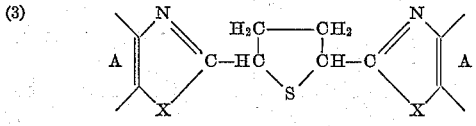

where A and X have the above meanings, or a salt thereof is treated at an elevated temperature with a dehydrogenating agent.

The phenylene radicals A in the above Formulae 1 and 3 may contain as substituents, for example, also a halogen atom, more especially a chlorine atom, a lower alkyl or alkoxy group with 1 to 4 carbon atoms, more especially a methyl or methoxy group, or a phenyl radical. These substituents are preferably in position 5 or 6 of the benzoxazole, benzthiazole or benzimidazole radical.

In the case of the imidazole derivatives corresponding to the general Formula 1 or 3—where X represents the group

R represents a hydrogen atom or an organic radical, more especially an aliphatic or araliphatic radical, above all a lower alkyl, alkenyl or hydroxyalkyl radical, such as, for example, as a methyl, ethyl, isopropyl, allyl or hydroxyethyl group.

The salts of the imidazole derivatives may be derived from any desired inorganic or organic acid, for example from sulfuric, hydrochloric or phosphoric acid, or also from arylsulfonic acids, for example paratoluenesulfonic acid.

As starting materials of the Formula 2 there are suitable in the case of imidazyl-thiophene compounds the orthodiamines of the benzene series in which one amino group is primary and the other at most secondary, for example 1:2 - diaminobenzene, 1 - amino-2-monomethylaminobenbene, 1-methyl-3:4-diaminobenzene, 1-methoxy-3:4-diaminobenzene, isopropyl-ortho-phenylenediamine or 1-chloro-3:4-diaminobenzene. In the case of the oxazole-thiophene derivatives there are suitable as starting materials, for example, 1-hydroxy-2-aminobenzene and 1-hydroxy-2-aminomethylbenzenes such as 1-hydroxy-2-amino-4- or -5-methylbenzene, and also 1-amino-2-hydroxy - 5 - methoxybenzene, 1-amino-2-hydroxy-5-tertiary butylbenzene and 1-amino-2-hydroxy-5-chlorobenzene, and in the case of the thiazole-thiophene derivatives, for example, 1-amino-2-mercaptobenzene.

As further starting materials for the present process there are used tetrahydrothiophene-2:5-dicarboxylic acid or functional derivatives thereof, for example esters or acid dihalides. The reaction can be performed either with the individual stereoisomeric forms or with mixtures of different stereoisomeric forms of tetrahydrothiophene-2:5-dicarboxylic acid or its functional derivatives. Particularly suitable esters of this dicarboxylic acid are those with lower aliphatic alcohols, for example the dimethyl ester or the diethyl ester.

It is of advantage to use of the two reactants—namely the aminobenzene of the above Formula 2 and the tetrahydrothiophene-2:5-dicarboxylic acid or a functional derivative of this dicarboxylic acid—at least approximately stoichiometric proportions; that is to say that for every molecular proportion of dicarboxylic acid there are used 2, or only little less or more than 2, molecular proportions of an aminobenzene of the Formula 2. The two reactants selected are reacted by heating at an elevated temperature, for example at about 90 to 260° C., if desired in an inert gas, for example under nitrogen. The reaction is preferably performed in the presence of a catalyst. Suitable catalysts are, for example, boric acid, sulfonic acids of the benzene series such as paratoluenesulfonic acid, also polyphosphoric acids including pyrophosphoric acid, and also zinc chloride. The reaction is advantageously conducted in a manner such as to give direct rise to compounds of the Formula 3, that is to say that the acylation of the ortho-amino compounds and the ring closure to the individual azole ring are carried out in a single operation.

When boric acid is used as catalyst, it is advantageously used in an amount of about 0.5 to 5% calculated from the total weight of the reaction mass. When boric acid or, for example, para-toluenesulfonic acid is used, it is of advantage to work in an inert high-boiling solvent, for example a substitution product of benzene such as monochlorobenzene, ortho-dichlorobenzene, trichlorobenzene, or high-boiling hydrocarbons of the benzene series, such as toluene, a xylene or para-cymene. It is of advantage to work at the boil in one of the aforementioned solvents, separating the water of reaction with the aid of a water separator from the distilled solvent and then returning the dehydrated solvent to the reaction mixture. Alternatively, the tetrahydrothiophene derivatives of the general Formula 3 can be made by simply melting together the two starting materials in a zinc chloride melt or in the presence of boric acid.

The reaction of the ortho-diaminobenzene with tetrahydrothiophene-2:5-dicarboxylic acid or with a functional derivative thereof to yield the imidazole tetrahydrothiophene compound of the general Formula 3 can advantageously also be carried out by heating the two reactants in an aqueous mineral acid, such as hydrochloric or phosphoric acid or more especially aqueous sulfuric acid at an elevated temperature, for example at about 90 to 110° C.

On completion of the reaction the resulting tetrahydrothiophene derivative of the general Formula 3 can be isolated from the reaction mixture in known manner.

The tetrahydrothiophene derivatives of the Formula 3 obtained in this manner are new; according to the invention they are treated at an elevated temperature with a dehydrogenating agent to yield bis-azolyl-thiophene compounds of the Formula 1.

Dehydrogenating agents suitable for use in the present process are, for example, mild oxidants, for example compounds of divalent mercury such as mercuric acetate or oxide, potassium permanganate or manganese dioxide, copper oxide or sulfate, hydrogen peroxide, selenium dioxide, platinum oxide; also ferric salts such as ferric sulfate or chloride, and organic oxidants such as nitro compounds, for example nitrobenzene and mixtures of, for example, nitrobenzene and quinoline. Air in admixture with, for example, quinoline can likewise be used for the dehydrogenation.

Another group of dehydrogenating agents contains the elements selenium and sulfur. Furthermore, there may also be used as dehydrogenating agents dehydrogenating catalysts, for example finely distributed nickel, copper, platinum or palladium, either as such or deposited on a carrier. Finally, there may also be used as dehydrogenating agents bromine, chlorine, phosphorus pentachloride, sulfuryl chloride, thionyl chloride and sulfur chlorides which are applied together with organic solvents, such as nitrobenzene, trichlorobenzene or glacial acetic acid.

The treatment with the dehydrogenating agents is performed at an elevated temperature, for example at 80 to 250° C., preferably in the presence of a solvent, for example with addition of glacial acetic acid, of a dilute mineral acid or of water. Thus, for example, mercuric acetate or ferric chloride, which are soluble in glacial acetic acid, may be reacted with a solution of the bisbenzoxazolyl-tetrahydrothiophene compound of the Formula 3 in glacial acetic acid; or, for example, a bisbenzimidazyl-tetrahydrothiophene compound of the Formula 3 or a salt thereof may be dissolved in a mixture of quinoline and nitrobenzene and heated for some time at an elevated temperature, for example at about 200° C.; or a tetrahydrothiophene compound or a salt thereof may be dissolved in quinoline and while refluxing this solution at about 175° C. a current of air passed through it.

The thiophene derivatives of the Formula 1 obtained by the present process display in the dissolved or finely dispersed state a more or less distinct fluorescence. They can be used for optically brightening organic materials, more especially fiber materials, or as intermediates for the manufacture of dyestuffs.

Unless otherwise indicated, parts in the following examples are by weight.

*Example 1*

35.2 parts of a mixture of cis- and trans-tetrahydrothiophene-2:5-dicarboxylic acid and 43.2 parts of 1:2-diaminobenzene are mixed at room temperature (about 20° C.) with a solution of 72 parts of concentrated sulfuric acid in 48 parts of water and stirred for 20 hours at 100° C. under nitrogen. On cooling, the dark-brown solution solidifies and forms a grey-brown paste which is stirred with 400 parts of water and then suction-filtered. The filter cake is washed neutral with water (indicator: Congo red) and dried in a water-jet vacuum at 90° C. until its weight remains constant, to yield about 68.9 parts of the compound of the formula (4) 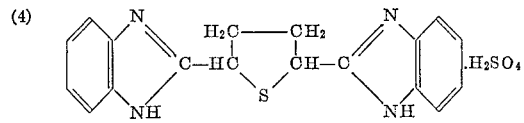

as a crystalline, pale-grey powder which slowly decomposes above 150° C. By recrystallization from hot sulfuric acid of 5% strength and decoloration with active carbon there are obtained colorless, hygroscopic crystals which slowly decompose above 193° C. and reveal the following analytical data:

$C_{18}H_{18}O_4N_4S_2$: 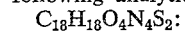

|  | C | H | N | S |
|---|---|---|---|---|
| Calculated...........percent.. | 51.66 | 4.34 | 13.39 | 15.32 |
| Found................do.... | 51.27 | 4.58 | 13.08 | 14.98 |

A solution of 8.36 parts of the 2:5-di-[benzimidazyl-(2′)]-tetrahydrothiophene sulfate of the Formula 4 in 24 parts by volume of quinoline and 8 parts by volume of nitrobenzene is refluxed for 3 hours at 200° C., then cooled, treated with 40 parts by volume of 5 N-sodium hydroxide solution, freed by steam distillation from nitrobenzene, quinoline and the aniline formed and then treated with active carbon, and finally adjusted with acetic acid to pH=about 7. The solution is then suction-filtered, and the residue is washed with water and dried under vacuum at 90° C., to yield about 2.8 parts of a brown-yellow powder which is dissolved in absolute ethanol and freed from colored by-products by being filtered through a column of 70 parts of alumina (chromatographic activity I, according to Brockmann). On evaporation there are obtained about 2.1 parts of a pale-yellow product which displays strong light-blue fluorescence in ultra-violet light. Crystallization from hot ethanol yields the compound of the formula (5) 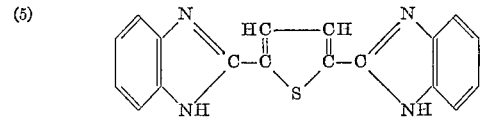

in the form of handsome pale-yellow crystals which decompose above 350° C.

Analysis $C_{18}H_{12}N_4S$:

|  | C | H | N |
|---|---|---|---|
| Calculated.....................percent.. | 68.33 | 3.82 | 17.71 |
| Found........................do.... | 68.40 | 4.13 | 17.59 |

*Example 2*

A solution of 8.36 parts of 2:5-di-[benzimidazyl-(2′)]-tetrahydrothiophene sulfate of the Formula 4, prepared as described in Example 1, in 12 parts by volume of quinoline is refluxed for 1 hour in an oilbath at 200° C. while passing through a current of air. The internal temperature is about 175° C. After cooling, the reaction mixture is worked up as described in Example 1.

There are obtained 1.2 parts of a yellow-brown powder which can be purified by chromatography on alumina to form a pale-yellow powder which has the identical properties as the product of the Formula 5 of Example 1.

*Example 3*

7.0 parts of a mixture of cis- and trans-tetrahydrothiophene-2:5-dicarboxylic acid and 8.4 parts of 1-amino-2-hydroxybenzene are dissolved with heating in 100 parts of pyrophosphoric acid; the mixture is heated and stirred with exclusion of moisture for 3 hours from 120 to 190° C. and then stirred for 2 hours longer at 190 to 195° C.

The mixture is then cooled to room temperature (about

20° C), and thoroughly stirred with 200 parts of water. The voluminous dark-brown precipitate is suctioned off and washed neutral with water. The crude product is dissolved in 50 parts by volume of dimethylformamide, diluted with 300 parts by volume of ethanol, treated with water until it remains turbid and the turbidity is caused to disappear again by heating. The solution is treated with active carbon and concentrated to about 250 parts by volume and left to itself for several days, whereupon there are obtained about 1.27 parts of brownish crystals. By further concentration of the mother liquor the yield of the compound of the formula (6)
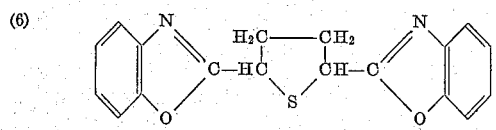

is increased to 2.27 parts.

Sublimation in a high vacuum at 200° C. furnishes colorless crystals melting at 131–135° C. The mixture of cis- and trans-2:5-di-[benzoxazolyl-(2′)]-tetrahydrothiophene reveals the following analytical data:

Analysis $C_{18}H_{14}O_2N_2S \cdot \frac{1}{4} H_2O$:

|  | C | H | N |
| --- | --- | --- | --- |
| Calculated_____percent__ | 66.24 | 4.28 | 8.59 |
| Found_____do____ | 66.32 | 4.42 | 8.64 |

A solution of 10 parts of 2:5-[benzoxazolyl-(2′)]-tetrahydrothiophene of the Formula 6 and 20 parts of mercuric acetate in 150 parts of glacial acetic acid is refluxed for 3 hours. The mixture is then cooled, freed by filtration from metallic mercury and a few yellowish crystals, and the filtrate is treated with water until it remains turbid. The turbidity is caused to disappear again by heating. After standing for several hours, there are obtained about 3 parts of the compound of the formula (7)
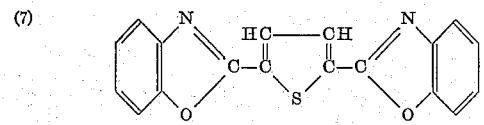

in the form of pale-brown cubic crystals melting at 185–203° C. These crystals can be recrystallized from dimethylformamide but it is much easier to purify them by sublimation in a high vacuum at 200° C. In this manner there are obtained, substantially free from any loss, pale-yellow crystals melting at 214 to 217° C. which display no depression of the melting point on admixture with a product obtained by reacting thiophene-2:5-dicarboxylic acid with 1-amino-2-hydroxybenzene.

Analysis $C_{18}H_{10}O_2N_2S$:

|  | C | H | N |
| --- | --- | --- | --- |
| Calculated_____percent__ | 67.91 | 3.17 | 8.80 |
| Found_____do____ | 67.96 | 3.11 | 8.92 |

*Example 4*

A mixture of 7 parts of tetrahydrothiophene-2:5-dicarboxylic acid, 8.7 parts of 1-amino-2-hydroxy-benzene and 0.2 part of boric acid is heated to 140° C., and the melt is raised to 200° C. in the course of 4 hours while being stirred under nitrogen. The 1-amino-2-hydroxy-benzene which sublimes on the wall of the vessel is returned from time to time to the reaction mixture. The melt is allowed to cool and then distributed between hydrochloric acid of 5% strength and ethyl acetate; the organic layer is washed with water and then with saturated sodium bicarbonate solution, dried with sodium sulfate and finally evaporated, to yield about 4.5 parts of brownish crystals melting at 105–127° C. Sublimation in a high vacuum at 200° C. furnishes the compound of the Formula 6 described in Example 3 in the form of colorless crystals melting at 131 to 135° C.

Further working up as described in Example 3 likewise yields 2:5-di-[benzoxazolyl-(2′)]-thiophene of the Formula 7.

*Example 5*

A mixture of 17.6 parts of tetrahydrothiophene-2:5-dicarboxylic acid, 25.0 parts of 1-amino-2-mercapto-benzene and 100 parts of pyrophosphoric acid is heated under nitrogen within 2 hours from 120 to 180° C. and then stirred for 2 hours at 180 to 190° C. The cooled melt is distributed between ethyl acetate and water and the organic phase is washed with N-sodium hydroxide solution and then with water, dried with sodium sulfate and evaporated, to yield about 28 parts of the compound of the formula (8)
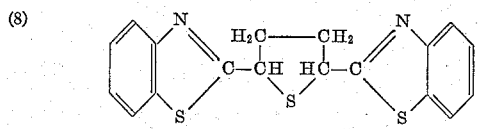

as a brownish yellow powder melting at 139–145° C. A specimen obtained in yellow crystals after three recrystallizations from hot dimethylformamide melts at 144 to 149° C.

Analysis $C_{18}H_{14}N_2S_3$:

|  | C | H | N |
| --- | --- | --- | --- |
| Calculated_____percent__ | 60.98 | 3.98 | 7.90 |
| Found_____do____ | 60.88 | 3.81 | 7.99 |

A mixture of 3.54 parts of the compound of the Formula 8, 10 parts of anhydrous ferric chloride and 100 parts by volume of glacial acetic acid is stirred under reflux for 5 hours. The reaction mixture is then distributed between water and chloroform, and the chloroform layer is separated, dried with sodium sulfate and evaporated. The resulting dark-brown powder is recrystallized from a minimum of boiling dimethylformamide, to yield about 2.2 parts of the compound of the formula (9)
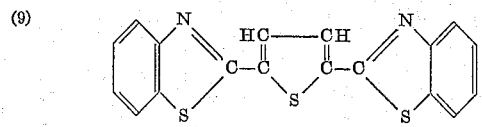

in the form of brownish yellow, shiny crystals melting at 232–233° C. which produce no depression of the melting point in admixture with a product prepared from thiophene-2:5-dicarboxylic acid and 1-amino-2-mercaptobenzene.

*Example 6*

8.36 parts of 2:5-di-[benzimidazyl-(2′)]-tetrahydrothiophene sulfate of the Formula 4—prepared as described in Example 1—and 1.28 parts of flowers of sulfur are dissolved in 24 parts by volume of quinoline and refluxed under nitrogen for 5 hours at 200° C. The mixture is allowed to cool to about 100° C. and then treated with 40 parts by volume of 5 N-sodium hydroxide solution, and the quinoline is removed by steam distillation. The alkaline solution is treated twice with active carbon, adjusted with acetic acid to pH=~7, and the precipitate is suctioned off, washed and dried, to yield about 2.08 parts of a brown powder which, after having been purified in an alcoholic solution on 30 times its own weight of alumina (activity I), yields 1.6 parts of a yellow-brown product which corresponds in all its properties with the final products obtained as described in Examples 1 and 2.

*Example 7*

88 parts of tetrahydrothiophene-2:5-dicarboxylic acid, 165 parts of 1-hydroxy-2-amino-4-tertiary butylbenzene and 2.5 parts of boric acid are intimately mixed, heated under nitrogen within 2 hours from 140 to 200° C. and then stirred for 2 hours at 200° C. Approximately 32 parts of water distil out of the melt. After cooling, the melt is distributed between ethyl acetate and hydrochloric acid of 5% strength, and the organic phase is washed with water and then with sodium carbonate solution of 10% strength, dried with sodium sulfate and concentrated under atmospheric pressure until it is of syrupy consistency. The slowly forming crystals are separated by filtration from the viscous oil and recrystallized from 4 times their own weight of boiling ethanol, to yield about 60 parts of the compound of the formula (10)

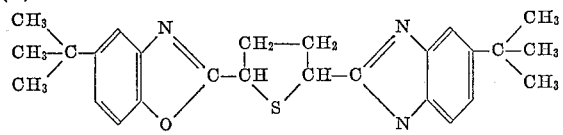

in the form of practically colorless crystals melting at 139–140° C.

Further concentration of the alcoholic mother liquor furnishes about 5 parts more of the identical product melting at 127–132° C.

After having been recrystallized three times, a specimen of the product melts at 142–143° C.

Analysis $C_{26}H_{30}O_2N_2S$:

|  | C | H | N |
| --- | --- | --- | --- |
| Calculated_____percent__ | 71.85 | 6.96 | 6.45 |
| Found_____do____ | 71.81 | 6.85 | 6.36 |

A solution of 4.35 parts of the compound of the Formula 10 in 20 parts by volume of trichlorobenzene is treated while being stirred in the course of 30 minutes at 50 to 60° C. with 2.70 parts of sulfuryl chloride, then rapidly heated to 150° C., stirred for 30 minutes at 150 to 160° C., cooled, and slowly mixed with 150 parts by volume of methanol. The brownish crystalline precipitate is recrystallized from 5 parts by volume of hot dimethylformamide, to yield about 2.05 parts of the compound of the formula (11)

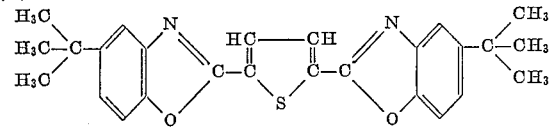

in the form of pale-yellow crystals melting at 192–193° C.

Example 8

21.73 parts of the compound of the Formula 10, prepared as described in Example 7, in 75 parts by volume of trichlorobenzene are treated at 150–160° C. in the course of about 45 minutes with 16.0 parts of bromine. After having stirred the mixture for 10 minutes at 160° C. the evolution of hydrogen bromide ceases. The mixture is allowed to cool to room temperature, and the crystalline precipitate is suctioned off, washed with a small amount of trichlorobenzene and then with methanol, and dried. Yield: about 11 parts of a biege powder melting at 180 to 186° C. After two recrystallizations from hot dimethylformamide there are obtained about 6.35 parts of the compound of the Formula 11 in the form of brownish yellow needles melting at 198 to 199° C. which produce no depression of the melting point in admixture with the final product of Example 7.

Example 9

A mixture of 4.35 parts of the compound of the Formula 10, prepared as described in Example 7, 10 parts of anhydrous ferric chloride and 100 parts by volume of glacial acetic acid is refluxed for 5 hours, then mixed with 200 parts of water, and the resulting grey-brown precipitate is suctioned off, washed, dried and recrystallized from hot dimethylformamide. Yield: about 2.95 parts of a brownish yellow crystalline powder melting at 197.5 to 200° C. which produces no depression of the melting point in admixture with the compound of the Formula 11 described in Examples 7 and 8.

Example 10

An intimate mixture of 1 part of the compound of the Formula 10, prepared as described in Example 7, and 1 part of palladium carbon of 5% strength is rapidly heated to 290° C., during which some hydrogen sulfide escapes. The reaction mixture is taken up in 10 parts by volume of hot chlorobenzene, the catalyst is filtered off, and the filtrate is treated with 40 parts by volume of methanol, to yield about 0.15 part of the compound of the Formula 11 in the form of pale-yellow needles melting at 198–199° C.

Example 11

43.5 parts of the compound of the Formula 10, prepared as described in Example 7, in 150 parts by volume of trichlorobenzene are treated within 60 minutes at 150–160° C. with 14 parts of chlorine. The mixture is stirred for 15 minutes at 160° C., after which the evolution of hydrogen chloride has practically ceased. The reaction mixture is concentrated in vacuum to about half its volume and yields about 20.8 parts of brownish yellow crystals melting at 172–180° C. Recrystallization from dimethylformamide produces 14.92 parts of pale-yellow crystals melting at 177–185° C. which can be separated on alumina (activity I) with the use of carbon tetrachloride and benzene as eluants into 5.8 parts of a yellow product which contains chlorine and melts at 160 to 162° C., and 7.05 parts of the compound of the Formula 11 melting at 190–200° C.

Example 12

An intimate mixture of 35.2 parts of tetrahydrothiophene-2:5-dicarboxylic acid, 56.0 parts of 1-hydroxy-2-amino-4-methylbenzene and 1 part of boric acid is cautiously heated under nitrogen within about 2 hours to 120–200° C. (while preventing strong foaming) and then stirred for 2 hours at 200° C., during which about 12 parts of water distill out of the melt. The reaction mixture is allowed to cool and then distributed between ethyl acetate and hydrochloric acid of 5% strength, and the organic layer is washed with water and then with sodium carbonate solution of 10% strength, dried with sodium sulfate and evaporated. The dark-brown, solid residue is treated in an alcoholic solution with active carbon and then recrystallized from a small amount of boiling dimethylformamide, to yield 14.3 parts of the compound of the formula (12)

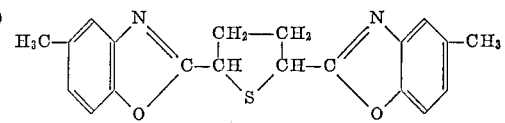

in the form of brownish crystals melting at 158–160° C. When the product is recrystallized four times from dimethylformamide, it melts at 177–178° C.

Analysis $C_{20}H_{18}O_2N_2S$:

|  | C | H | N |
| --- | --- | --- | --- |
| Calculated_____percent__ | 68.55 | 5.18 | 7.99 |
| Found_____do____ | 67.62 | 5.23 | 7.81 |

Example 13

A mixture of 7.1 parts of tetrahydrothiophene-2:5-dicarboxylic acid, 9.8 parts of 1:2-diamino-4-methylbenzene and 24 parts of sulfuric acid of 60% strength is stirred for 20 hours at 100° C. under nitrogen, then allowed to cool and suction-filtered. The filter residue is washed and dried, to yield about 13.5 parts of a grey powder. The sulfate is converted with excess ammonium hydroxide into the free base, with concentrated hydrochloric acid into the hydrochloride of the formula

(13)
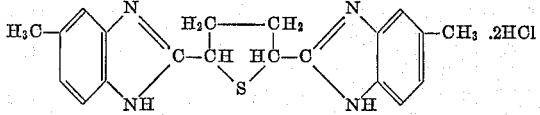

and is recrystallized for analysis three times from hot hydrochloric acid of 1% strength. The colorless, very hygroscopic crystals decompose above 250° C.

Analysis $C_{20}H_{22}N_4SCl_2 \cdot 1H_2O$:

|  | C | H | N |
|---|---|---|---|
| Calculated_____percent__ | 54.70 | 5.50 | 12.75 |
| Found_____do____ | 55.08 | 5.47 | 13.18 |

*Example 14*

A mixture of 5.5 parts of tetrahydrothiophene-2:5-dicarboxylic acid, 11.5 parts of 1-amino-2-methylaminobenzene and 18 parts of sulfuric acid of 60% strength is stirred under nitrogen for 20 hours at 100° C., then allowed to cool and suction-filtered. The filter cake is washed and dried, to yield about 11.1 parts of a greenish amorphous substance which is recrystallized four times from 8 times its own weight of hot sulfuric acid of 10% strength, thoroughly washed with water and dried in a high vacuum over phosphorus pentoxide at 105° C., to yield the sulfate of the formula

(14)
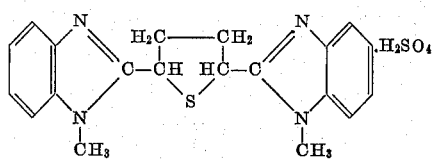

in the form of colorless crystals melting at 246–248° C., which—as revealed by analysis—contain ½ mol of water and ½ mol of sulfuric acid:

Analysis $C_{20}H_{22}S_2O_4 \cdot \frac{1}{2}H_2O \cdot \frac{1}{2}H_2SO_4$:

|  | C | H | N |
|---|---|---|---|
| Calculated_____percent__ | 47.61 | 4.59 | 11.10 |
| Found_____do____ | 47.33 | 4.79 | 11.12 |

What is claimed is:

1. A bis-azolyl-tetrahydrothiophene compound of the formula

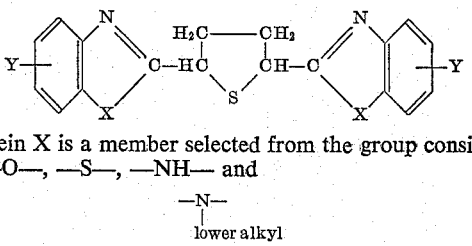

wherein X is a member selected from the group consisting of —O—, —S—, —NH— and

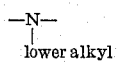

and Y is a member selected from the group consisting of hydrogen and lower alkyl.

2. A bis-oxazolyl-tetrahydrothiophene compound of the formula

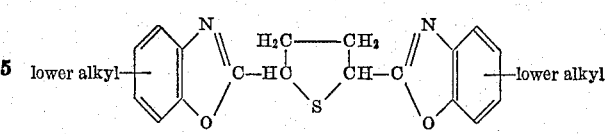

3. The compound of the formula

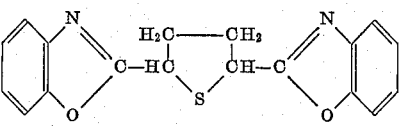

4. The compound of the formula

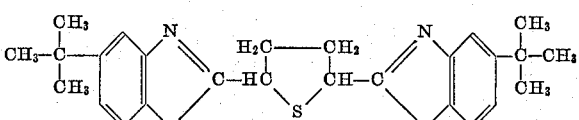

5. The compound of the formula

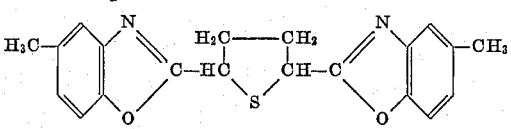

6. The compound of the formula

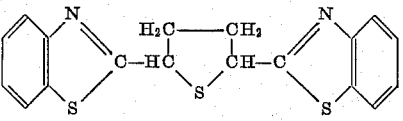

7. The compound of the formula

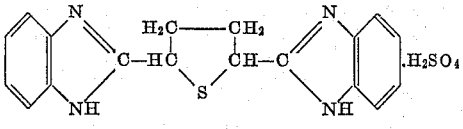

8. The compound of the formula

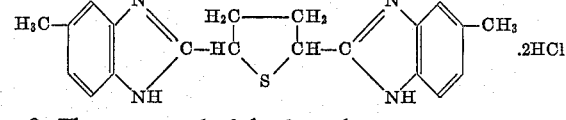

9. The compound of the formula

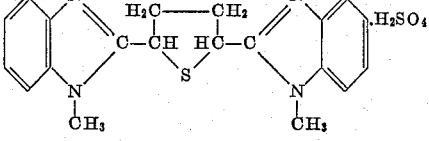

References Cited in the file of this patent

UNITED STATES PATENTS

| 2,483,392 | Meyer et al. | Oct. 4, 1949 |
| 2,808,407 | Ackermann et al. | Oct. 1, 1957 |
| 2,985,661 | Hein et al. | May 23, 1961 |
| 2,995,564 | Duennenberger et al. | Aug. 8, 1961 |
| 3,010,967 | Siegrist et al. | Nov. 28, 1961 |

OTHER REFERENCES

Yurev et al.: Ber. Deut. Chem., vol. 69B, pp. 1395–8 (1936).